(12) United States Patent
Festag et al.

(10) Patent No.: US 8,573,635 B2
(45) Date of Patent: Nov. 5, 2013

(54) VEHICLE SEAT ASSEMBLY WITH AIR BAG PROTECTION MEMBER

(75) Inventors: Peter Festag, Erding (DE); Michael Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/315,751

(22) Filed: Dec. 9, 2011

(65) Prior Publication Data
US 2012/0175924 A1 Jul. 12, 2012

(30) Foreign Application Priority Data

Jan. 12, 2011 (DE) .......................... 10 2011 002 559

(51) Int. Cl.
*B60R 21/16* (2006.01)
(52) U.S. Cl.
USPC ....................................................... 280/730.2
(58) Field of Classification Search
USPC ........................................... 280/728.3, 730.2
See application file for complete search history.

(56) References Cited

U.S. PATENT DOCUMENTS

| | | | |
|---|---|---|---|
| 5,498,030 A | 3/1996 | Hill et al. | |
| 5,749,597 A | 5/1998 | Saderholm | |
| 5,860,673 A * | 1/1999 | Hasegawa et al. | ......... 280/730.2 |
| 5,927,749 A | 7/1999 | Homier et al. | |
| 5,967,546 A | 10/1999 | Homier et al. | |
| 6,045,151 A | 4/2000 | Wu | |
| 6,206,466 B1 | 3/2001 | Komatsu | |
| 6,386,577 B1 | 5/2002 | Kan et al. | |
| 6,450,528 B1 | 9/2002 | Suezawa et al. | |
| 6,457,741 B2 | 10/2002 | Seki et al. | |
| 7,004,496 B2 * | 2/2006 | Bossecker et al. | ......... 280/730.2 |
| 7,357,412 B2 * | 4/2008 | Tracht et al. | ............... 280/730.2 |
| 7,380,812 B2 | 6/2008 | Tracht et al. | |
| 7,445,234 B2 | 11/2008 | Hofmann | |
| 7,540,529 B2 * | 6/2009 | Tracht et al. | ............... 280/730.2 |
| 7,669,889 B1 * | 3/2010 | Gorman et al. | ............ 280/730.2 |

(Continued)

FOREIGN PATENT DOCUMENTS

| | | | |
|---|---|---|---|
| DE | 102005057439 A1 | 7/2006 | |
| DE | 102005057499 A1 | 7/2006 | |

(Continued)

OTHER PUBLICATIONS

German Office Action Dated Nov. 8, 2011, Applicant Lear Corporation, Application No. 10 2011 002 559.6.

*Primary Examiner* — Faye M. Fleming
(74) *Attorney, Agent, or Firm* — Brooks Kushman P.C.

(57) ABSTRACT

A vehicle seat assembly according to the present disclosure includes an air bag module having a front and a side, and the air bag module includes an inflatable air bag and a flexible cover at least partially covering the air bag. The flexible cover may include a protection portion that extends at least partially along the side of the air bag module. The protection portion has an end spaced away from the front of the air bag module, and the end is releasably connected to another portion of the air bag module. The seat assembly further includes a seat pad disposed outside of the air bag module, and a trim cover positioned over the seat pad. Upon inflation of the air bag, the end of the protection portion is configured to disconnect from the another portion of the air bag module and extend forwardly such that the protection portion extends between the seat pad and the air bag, or between the trim cover and the air bag.

21 Claims, 4 Drawing Sheets

(56) References Cited

U.S. PATENT DOCUMENTS

| | | |
|---|---|---|
| 7,681,907 B2 * | 3/2010 | Svenbrant et al. ......... 280/728.2 |
| 7,695,064 B2 | 4/2010 | Thomas et al. |
| 7,789,419 B2 * | 9/2010 | Smith ....................... 280/730.2 |
| 7,883,105 B2 * | 2/2011 | Smith ....................... 280/730.2 |
| 7,891,701 B2 * | 2/2011 | Tracht et al. ............... 280/730.2 |
| 7,909,359 B2 | 3/2011 | Inoue et al. |
| 8,177,256 B2 * | 5/2012 | Smith et al. ............... 280/730.2 |
| 8,439,394 B2 | 5/2013 | Tracht |
| 2002/0130495 A1 | 9/2002 | Lotspih et al. |
| 2002/0163169 A1 * | 11/2002 | Fischer ..................... 280/730.2 |
| 2007/0057493 A1 | 3/2007 | Ritzel et al. |
| 2008/0284143 A1 | 11/2008 | Smith et al. |
| 2012/0068442 A1 * | 3/2012 | Wagner ..................... 280/730.2 |
| 2012/0175862 A1 * | 7/2012 | Tracht ....................... 280/730.2 |

FOREIGN PATENT DOCUMENTS

| | | |
|---|---|---|
| DE | 102008016094 A1 | 10/2008 |
| DE | 102007022620 A1 | 11/2008 |
| DE | 102009025583 A1 | 3/2010 |
| GB | 2398546 A | 8/2004 |

* cited by examiner

VEHICLE SEAT ASSEMBLY WITH AIR BAG PROTECTION MEMBER

CROSS-REFERENCE TO RELATED APPLICATIONS

This application claims foreign priority benefits under 35 U.S.C. §119(a)-(d) to DE 10 2011 002 559.6, filed Jan. 12, 2011, which is hereby incorporated by reference in its entirety.

BACKGROUND

1. Field of the Disclosure

The present disclosure relates to a vehicle seat assembly having an inflatable air bag.

2. Background Art

Vehicle seat assemblies may be provided with inflatable air bags. U.S. Pat. Nos. 6,045,151 and 6,237,934 disclose examples of such vehicle seat assemblies.

SUMMARY

A vehicle seat assembly according to the present disclosure includes an air bag module having a front and a side, and the air bag module further includes an inflatable air bag and a flexible cover at least partially covering the air bag. The flexible cover forms an outermost portion of the air bag module and includes a protection portion that extends at least partially along the side of the air bag module. The protection portion has an end spaced away from the front of the air bag module, and the end is releasably connected to another portion of the air bag module. The seat assembly further includes a seat pad disposed outside of the air bag module, and a trim cover positioned over the seat pad. Upon inflation of the air bag, the end of the protection portion is configured to disconnect from the another portion of the air bag module and move forwardly such that the protection portion extends between the seat pad and the air bag, or between the trim cover and the air bag.

An air bag module for use with a vehicle seat having a seat pad and trim cover is also disclosed. The air bag module has an inflatable air bag, and a flexible member covering a portion of the air bag and forming an outermost portion of the air bag module. The flexible member includes a protection portion having an end that is spaced away from a front of the air bag module, and the end is releasably connected to the air bag or another portion of the flexible member. Upon inflation of the air bag, the end of the protection portion is configured to be released and move forwardly such that the protection portion extends between a portion of the seat pad and the air bag, or between a portion of the trim cover and the air bag.

Still further, a vehicle seat assembly according to the present disclosure includes an air bag module having a front and a side. The air bag module further includes an inflatable air bag and a flexible cover at least partially covering the air bag. The flexible cover has a frangible portion that at least partially defines a flap portion. The flap portion extends at least partially along the front and the side of the air bag module and has an end spaced away from the front of the air bag module. The seat assembly further includes a seat pad portion disposed in front of the air bag module, and a trim cover positioned over the seat pad. Upon inflation of the air bag, the frangible portion of the flexible cover is configured to rupture and the end of the flap portion is configured to move forwardly such that the flap portion extends between the seat pad portion and the air bag, or between the trim cover and the air bag.

While exemplary embodiments are illustrated and disclosed, such disclosure should not be construed to limit the claims. It is anticipated that various modifications and alternative designs may be made without departing from the scope of the invention.

DETAILED DESCRIPTION

The present disclosure describes various vehicle seat configurations that include an inflatable air bag assembly. Several specific embodiments are set forth in the following description and in FIGS. 1-13 to provide a thorough understanding of certain embodiments according to the present disclosure. As those of ordinary skill in the art will understand, one or more features of an embodiment illustrated and described with reference to any one of the Figures may be combined with features illustrated in one or more other Figures to produce embodiments that are not explicitly illustrated or described. In addition, other embodiments may be practiced without one or more of the specific features explained in the following description.

Figure 1:
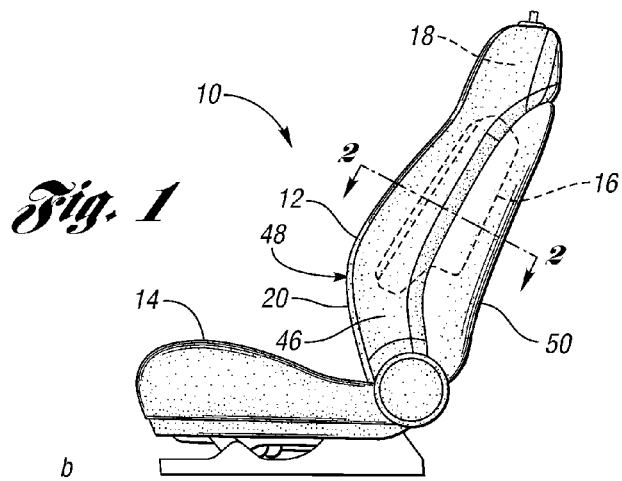
FIG. 1 is a side view of a vehicle seat assembly according to the present disclosure and including an air bag module positioned in a seat back cushion assembly.

FIG. 1 shows a vehicle seat assembly 10 according to the present disclosure for use in a motor vehicle. The seat assembly 10 includes a seat back cushion assembly 12 and a seat bottom cushion assembly 14 attached to the seat back cushion assembly 12. The seat back cushion assembly 12 includes an air bag arrangement or assembly, such as a soft cover air bag module 16, a seat pad 18 overlaying the air bag module 16, and a trim cover 20 overlaying the seat pad 18 and air bag module 16.

Figure 2:
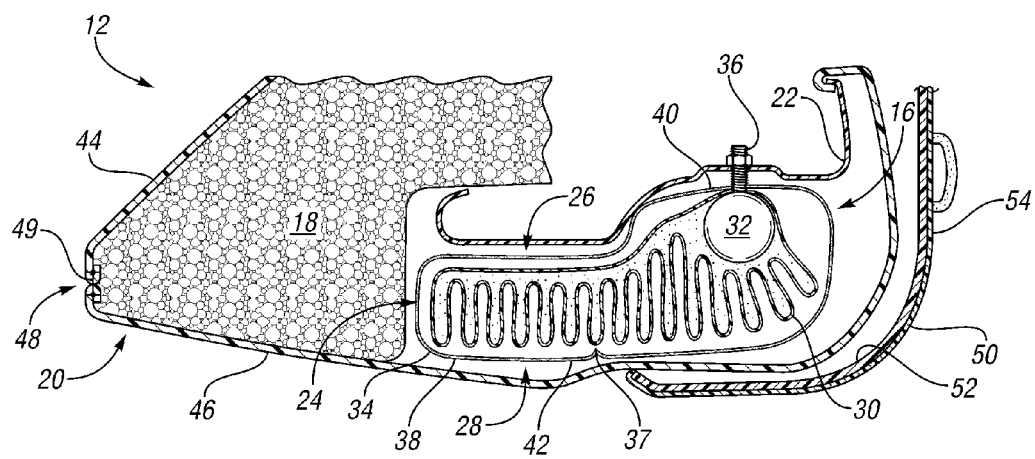
FIG. 2 is a fragmentary cross-sectional view of the seat back cushion assembly taken along line 2-2 of FIG. 1 and showing various components of the air bag module, including an inflatable air bag and a flexible member that covers the air bag.

As shown in FIG. 2, the air bag module 16 may be disposed proximate one side of the seat back cushion assembly 12, such as an outboard lateral side or an inboard lateral side, and may be connected to a support member, such as a seat back frame 22. In the embodiment shown in FIG. 2, the air bag module 16 is disposed on an outboard side of the seat back frame 22. As another example, the air bag module 16 may be connected to the frame 22 such that the air bag module 16 is disposed on an inboard side of the frame 22. As yet another example, the air bag module 16 may be located in any suitable position on the seat back cushion assembly 12 or seat bottom cushion assembly 14. Furthermore, the seat back cushion assembly 12 and seat bottom cushion assembly 14 may each be provided with multiple air bag modules 16, such as outboard and inboard air bag modules 16 that each have a similar configuration and function as described below in detail.

In the embodiment shown in FIG. 2, the air bag module 16 has a front 24 and first and second sides, such as inboard and outboard sides 26 and 28, respectively. The inboard side 26 is positioned closer to the center of the seat back cushion assembly 12 than the outboard side 28, and the outboard side 28 may be positioned proximate a door panel of a vehicle in which the seat assembly is installed. Furthermore, the air bag module 16 includes an inflatable air bag 30, an inflator 32 attached to the air bag 30 for inflating the air bag 30, and a flexible member, such as cover 34, that at least partially covers the air bag 30 and inflator 32.

The inflator 32 may be connected to the frame 22, or other suitable support member, in any suitable manner, such as with one or more fasteners 36. The fasteners 36, which may each include a bolt and nut for example, may also be used to connect the cover 34 to the frame 22. Alternatively, the air bag module 16 may be connected to the frame 22, or other suitable support member, in any suitable manner.

In the embodiment shown in FIG. 2, the cover 34 completely surrounds the air bag 30 and inflator 32, and forms the outermost portion of the air bag module 16. In such an embodiment, the air bag module 16 does not include a rigid housing, such as a plastic housing, and may be referred to as a "soft cover" air bag module. In other "soft cover" embodiments, the cover 34 may partially cover the air bag 30 and/or inflator 32.

Furthermore, the cover 34 may be made of a single sheet of any suitable flexible material, or multiple pieces of flexible material that are joined together in any suitable manner, such as by a sewing process. For example, the cover 34 may be made of flexible fabric, such as nylon, Kevlar®, or any other suitable polyamide, synthetic material, or natural material.

In the embodiment shown in FIG. 2, the cover 34 has a frangible portion 37, such as a rupture or tear section or seam, that at least partially defines a protection portion, such as flap portion 38, which is described below in more detail. For example, the frangible portion 37 may be a sewn seam or a perforated or otherwise weakened section or area of the cover 34 that is designed to rupture upon inflation of the air bag 30.

Figure 3:
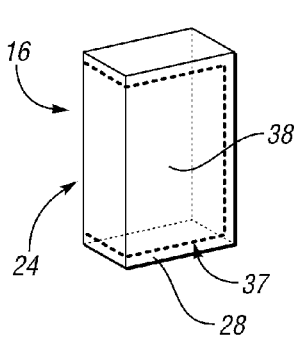
FIG. 3 is a schematic view of the air bag module showing an example configuration of a frangible portion of the flexible member.
Figure 4:
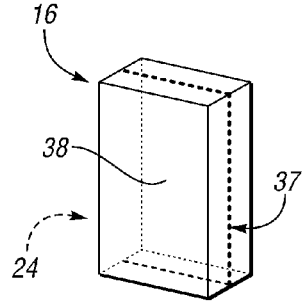
FIG. 4 is a schematic view of the air bag module showing another example configuration of the frangible portion of the flexible member.
Figure 5:
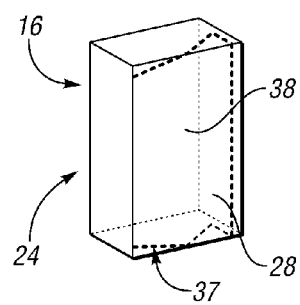
FIG. 5 is a schematic view of the air bag module showing yet another example configuration of the frangible portion of the flexible member.

While the frangible portion 37 may have any suitable configuration, example configurations are shown in FIGS. 3-5. In the embodiment shown in FIG. 3, the frangible portion 37 extends along top and bottom portions of the front 24 of the air bag module 16, and along top, rear and bottom portions of the outboard side 28 of the air bag module 16. In the embodiment shown in FIG. 4, the frangible portion 37 extends from the front 24 of the air bag module 16 along top, rear and bottom portions of the air bag module 16. In the embodiment shown in FIG. 5, the frangible portion 37 extends partially along the outboard side 28 of the air bag module 16, and partially along the top and bottom portions of the air bag module 16.

As another example, the frangible portion 37 may be disposed on the inboard side 26 of the air bag module 16, or extend at least partially on the inboard side 26. As a more detailed example, the frangible portion 37 may be disposed at or near the fasteners 36, such that the resultant flap portion extends from the front 24 of the air bag module 16 along the outboard side 28 and at least partially along the inboard side 26.

In each of the embodiments shown in FIGS. 3-5, at least a section of the frangible portion 37 extends generally vertically or upwardly along the entire length or height of the air bag module 16, or a substantial portion of the height of the air bag module 16, and that section is spaced rearwardly away from the front 24 of the air bag module 16. For example, the generally upwardly extending section of the frangible portion 37 may extend at least 50% of the height of the air bag module 16. As another example, the generally upwardly extending section of the frangible portion 37 may extend at least 75% of the height of the air bag module 16.

Returning to FIG. 2, the illustrated flap portion 38 is a single thickness or layer of material (e.g., the flap portion 38 is not folded over or on itself) and extends along the front 24 and sides 26 and 28 of the air bag module 16. Furthermore, the flap portion 38 has a first secured portion or end 40, and a second releasable portion or end 42 disposed adjacent the frangible portion 37 such that the second end 42 is spaced away from the front 24 of the air bag module 16. In the embodiment shown in FIG. 2, the first end 40 is attached to the frame 22 with one or more of the fasteners 36. Alternatively, the first end 40 may be secured in any suitable manner. For example, the first end 40 may be attached to frame 22, or another component connected to the frame 22, with adhesive and/or one or more fasteners. As another example, the first end 40 may be attached directly to the air bag 30 and/or inflator 32. As a more detailed example, the first end 40 may be sewn to the air bag 24.

In the embodiment shown in FIG. 2, the second end 42 is disposed on the outboard side 28 of the air bag module 16 rearward of the front 24 of the air bag module 16, and the second end 42 faces rearwardly. As another example the second end 42 may be disposed at or near a rear portion of the air bag module 16. As yet another example, the second end 42 may be disposed on the inboard side 26 of the air bag module 16.

Upon inflation of the air bag 30, the frangible portion 37 is configured to rupture to release the second end 42, such that the flap portion 38 may move or extend forwardly generally in a deployment direction of the air bag 30. If the second end 42 is disposed on the inboard side 26 of the air bag module, the second end 42 may first move rearwardly before moving forwardly. When the flap portion 38 moves forwardly, the flap portion 38 may extend between a portion of the seat pad 18 and the air bag 30, thereby protecting the seat pad 18 and/or the air bag 30.

Still referring to FIG. 2, the seat pad 18 may be disposed adjacent the air bag module 16 and the frame 22. For example, the seat pad 18 may be disposed in front of and along an inboard side of the air bag module 16 and frame 22, as shown in FIG. 2. As another example, the seat pad 18 may be disposed in front of, behind and along the inboard and outboard sides 26 and 28 of the air bag module 16 and frame 22. In at least one embodiment, the seat pad 18 is made from a molded polymeric material, such as a polyurethane foam. Alternatively, the seat pad 18 may comprise any suitable material, and may be made in any suitable manner.

The trim cover 20 may be made of any suitable material, such as cloth, vinyl and/or leather, and may be provided with or without a padding layer and/or backing layer. Furthermore, the trim cover 20 may include multiple pieces that are joined together at seams. In the embodiment shown in FIGS. 1 and 2, the trim cover 20 includes first and second sections 44 and 46, respectively, that cooperate to define a deployment seam 48 through which the air bag 30 may deploy. For example, the sections 44 and 46 may be connected together such as with sewn stitching 49, as shown in FIG. 2. As another example, ends of the first and second sections 44 and 46, respectively, may not be directly connected together, but merely abut each other to define the seam 48.

As shown in FIGS. 1 and 2, a relatively rigid panel 50 may also be provided in the rear area of the seat back cushion assembly 12 to provide support, to cover a portion of the seat back cushion assembly 12 and/or for aesthetics. The panel 50 may include a main body 52, such as a plastic molding. In addition, the panel 50 may include a cover layer 54 made of any suitable material, such as cloth, leather or vinyl, attached to the main body 52.

Figure 6:
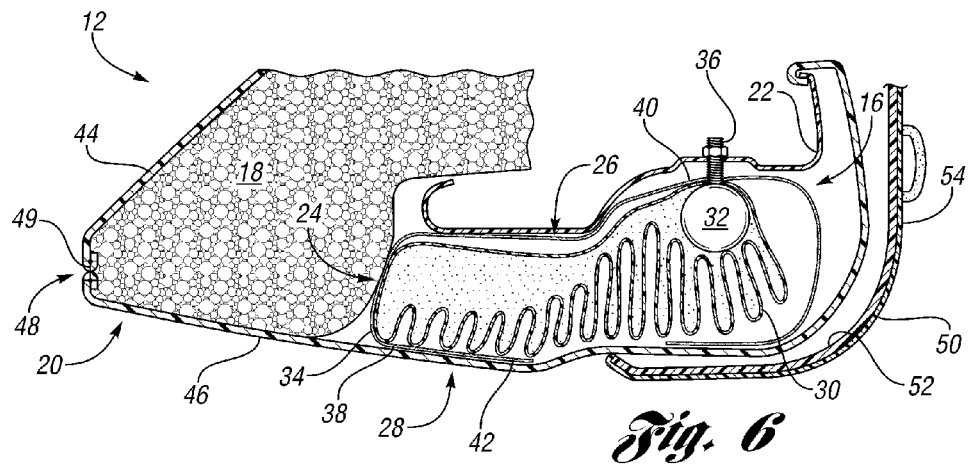
FIG. 6 is a fragmentary cross-sectional view of the seat back cushion assembly, similar to FIG. 2, showing the air bag partially inflated.
Figure 7:
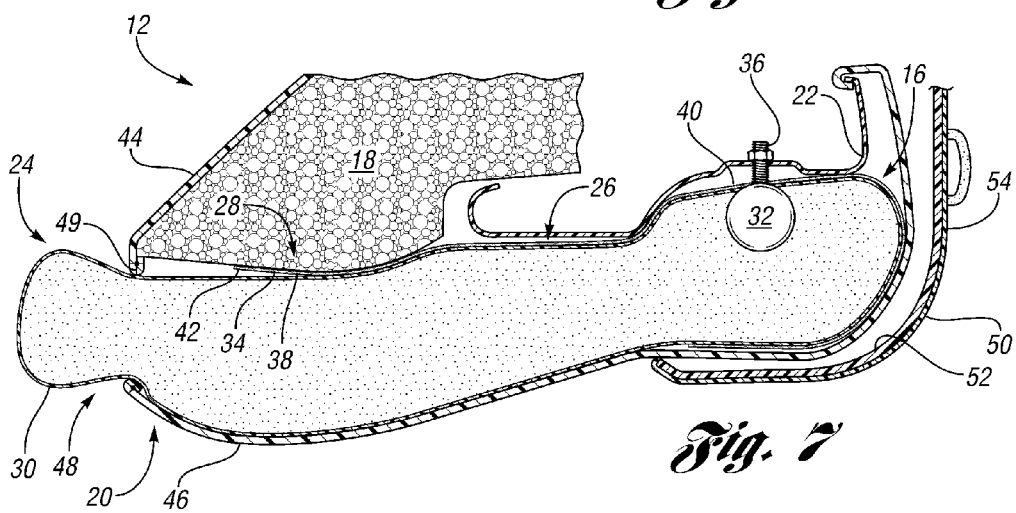
FIG. 7 is a fragmentary cross-sectional view of the seat back cushion assembly showing the air bag more fully inflated and an end of the flexible member extending forwardly.

Referring to FIGS. 2, 6 and 7, operation of the vehicle seat assembly 10 will now be described in detail. Upon a sufficient triggering event, such as impact to a vehicle in which the seat assembly 10 is mounted or other sufficient acceleration or deceleration event, for example, the air bag module 16 may be activated in any suitable manner to cause the air bag 30 to deploy. During deployment, the inflator 32 inflates the air bag 30, which causes the frangible portion 37 to rupture. As shown in FIG. 6, the expanding air bag 30 causes a front portion and the second end 42 of the flap portion 38 to move forwardly.

Referring to FIG. 7, as the air bag 30 continues to inflate, the air bag 30 causes the second end 42 of the flap portion 38 to extend between the seat pad 18 and the air bag 30. The inflating air bag 30 may also rupture the deployment seam 48 so that the air bag 30 may project through the trim cover 20.

In the embodiment shown in FIG. 7, the flap portion 38 and the remainder of the cover 34 do not extend outside of the trim cover 20 during and after inflation of the air bag 30. In another embodiment, the flap portion 38 may be configured to extend outside of the trim cover 20 during inflation of the air bag 30.

With the above configuration, the cover 34 may protect the seat pad 18 and inhibit or prevent portions of the seat pad 18 from breaking off during deployment of the air bag 30. The cover 34 may also facilitate deployment of the air bag 30 by providing a guide surface for the air bag 30 and/or by reducing friction between the air bag 30 and the seat pad 18 or other components of the seat assembly 10.

FIGS. 8-13 show other example embodiments 16', 16" and 16''' of an air bag module according to the present disclosure for use with a vehicle seat assembly, such as seat assembly 10. These embodiments function in a similar manner as discussed above in detail.

Figure 8:
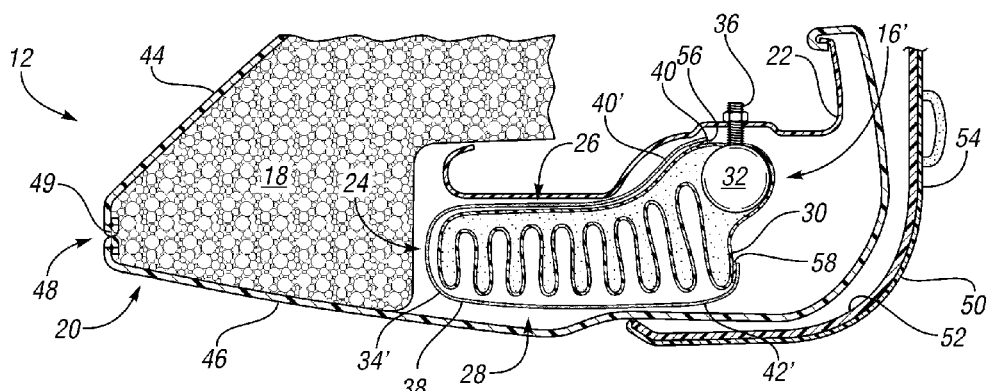
FIG. 8 is a cross-sectional view of another embodiment of an air bag module according to the present disclosure.

In the embodiment 16' shown in FIG. 8, flexible member or cover 34' partially covers air bag 30 and has a first portion, such as first end 40', fixedly secured directly to the air bag 30 with a first attachment member 56, such as stitching and/or adhesive, or in any other suitable manner. The cover 34' further has a second portion, such as second end 42', releasably secured to another portion of the air bag 30 with a second releasable attachment member 58, such as stitching or adhesive, or in any other suitable manner. Upon inflation of the air bag 30, the first attachment member 56 is configured to maintain attachment between the air bag 30 and the first end 40' of the cover 34', while the second attachment member 58 is configured to allow the second end 42' to be released from the air bag 30 and extend forwardly, such that the second end 42' extends between an outboard side of the seat pad 18 and the air bag 30. With this configuration, the entire cover 34', or a substantial portion of the cover 34', may function as a flap portion that is configured to extend between the seat pad 18 and the air bag 30.

As another example, the first end 40' of the cover 34' may be fixedly attached to frame 22 with one or more fasteners 36 that attach inflator 32 to the frame 22. With that arrangement, the fasteners 36 may be configured to maintain attachment of the first end 40' to the frame 22 upon inflation of the air bag 30, while the second attachment member 58 is configured to allow the second end 42' to be released from the air bag 30 and extend forwardly, such that the second end 42' extends between an outboard side of the seat pad 18 and the air bag 30.

Figure 9:
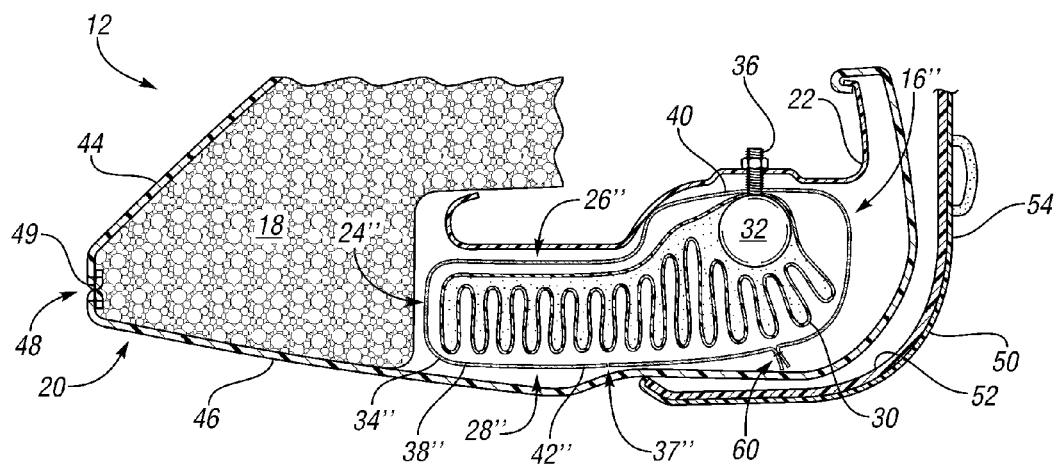
FIG. 9 is a cross-sectional view of yet another embodiment of an air bag module according to the present disclosure, wherein the air bag module includes a flexible cover having a connection seam and a frangible portion.
Figure 10:
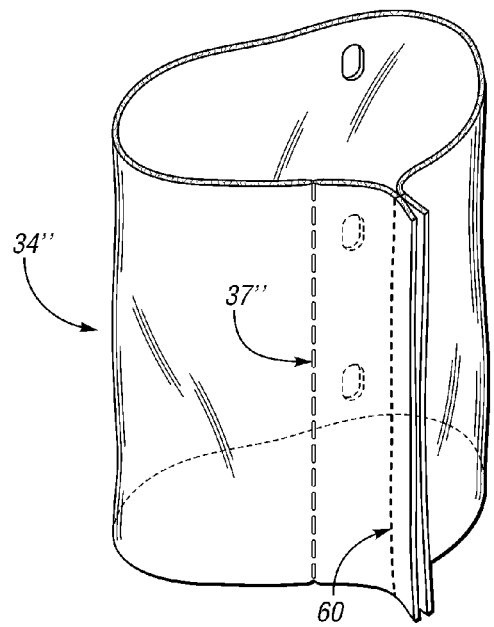
FIG. 10 is a perspective of the cover shown in FIG. 9.

In the embodiment 16" shown in FIG. 9, flexible member or cover 34" is made of a single sheet of flexible material that surrounds air bag 30 and inflator 32. The cover 34" has first and second ends that are sewn or otherwise connected together at a seam 60. The cover 34" also has a frangible portion 37", such as a sewn seam or a perforated, cut or otherwise weakened area, that is spaced away from the seam 60. The cover 34" may also be attached to frame 22 using one or more fasteners 36 that attach the inflator 32 to the frame 22.

As with the first embodiment, the frangible portion 37" at least partially defines a flap portion 38" that extends along front 24" and inboard and outboard sides 26" and 28", respectively, of the air bag module 16". Upon inflation of the air bag 30, the frangible portion 37" is configured to rupture, such that an end 42" of the flap portion 38" may move forwardly and extend between the inflating air bag 30 and seat pad 18. As mentioned above, the inflating air bag 30 may also rupture the deployment seam 48 so that the air bag 30 may project through the trim cover 20.

With the above configuration of the air bag module 16", the seam 60 can be formed in an operation that does not need to be strictly controlled, since that seam does not need to rupture. Furthermore, the frangible portion 37" may be formed by a perforating or cutting operation, which may be more cost effective than forming a rupturable sewn seam.

Although the seam 60 is shown on the outboard side of the air bag module 16", the seam 60 may be located at any suitable position. For example, the seam 60 may be formed at the front or inboard side of the air bag module 16". Furthermore, the cover 34" may be made of multiple pieces of sheet material that are sewn or otherwise connected together. In addition, the cover 34" may be configured to partially cover the air bag 30 and/or inflator 32, rather than completely surround the air bag 30 and inflator 32.

Figure 11:
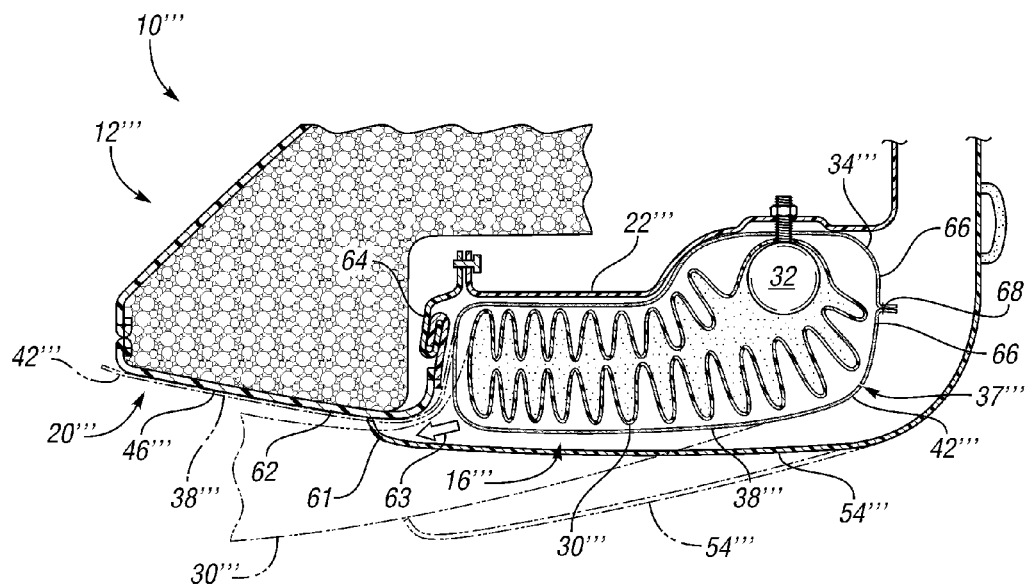
FIG. 11 is a cross-sectional view of still yet another embodiment of an air bag module and seat assembly according to the present disclosure, showing an uninflated air bag of the air bag module in solid lines, and a fragmentary view of the air bag as inflated in phantom lines.

In the embodiment 16''' shown in FIG. 11, air bag 30''' of air bag module 16''' deploys between back panel 54''' and trim cover 20''' of seat back 12''' of seat assembly 10'''. More specifically, air bag 30''' deploys, in a forward deployment direction, between a front portion 61 of back panel 54''' and an outboard side 62 of second section 46''' of trim cover 20''', as shown in phantom lines in FIG. 11 and as indicated by deployment direction arrow 63. Furthermore, second section 46''' of the trim cover 20''' is connected, via a J-clip or other suitable fastener, to a plastic retainer member 64, which is attached to a front portion of frame 22''' in any suitable manner, such as with one or more fasteners. As another example, the retainer member 64 may be omitted, and the trim cover 20''' may be connected directly to the frame 22''' such as with one or more J-clips.

Figure 12:
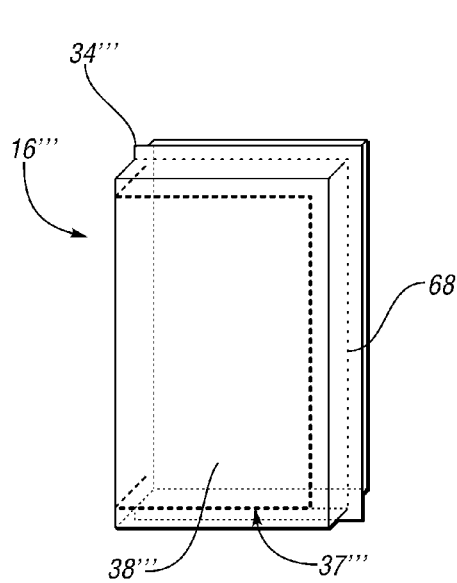
FIG. 12 is a schematic perspective side view of the air bag module of FIG. 11.
Figure 13:
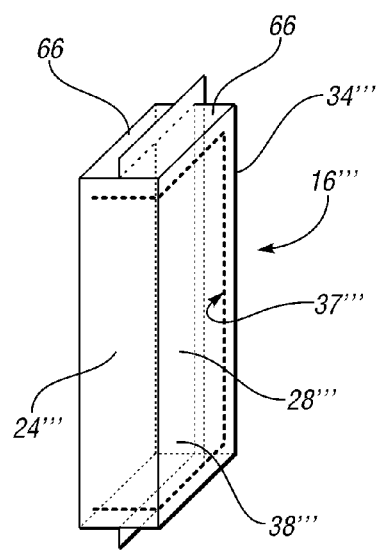
FIG. 13 is a schematic perspective front view of the air bag module of FIG. 12.

Referring to FIGS. 11-13, the air bag module 16''' includes a flexible member or cover 34''' that completely covers air bag 30'''. The cover 34''' may be made of a single piece of material including two sections 66 that are folded and joined together in any suitable manner to form a pocket. For example, the sections 66 may be sewn together along a sewn seam 68 that extends along top, rear and bottom portions of the air bag module 16'''. The cover 34''' further has a frangible portion 37''', such as a perforated line, that is spaced away from the sewn seam 68. In the embodiment shown in FIGS. 12 and 13, for example, the frangible portion 37''' extends along top and bottom portions of the front 24''' of the air bag module 16''', as well as along top, rear and bottom portions of the outboard side 28''' of the air bag module 16'''.

The frangible portion 37''' defines a flap portion 38''' that extends along the outboard side 28''' and front 24''' of the air bag module 16'''. Upon inflation of the air bag 30''', the frangible portion 37''' ruptures and the flap portion 38''' extends forwardly, such that an end 42''' of the flap portion 38''' extends between the outboard side 62 of the trim cover 20''' and the air bag 30''', as shown in phantom lines in FIG. 11.

In the above embodiment, the flap portion 38''' sufficiently covers retainer member 64 and protects the air bag 30 during deployment. Furthermore, the flap portion 38''' extends over outboard side 62 of the trim cover 20''' during air bag deployment, and provides a smooth deployment surface for the air bag 30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, any of the above air bag module embodiments may be use with any suitable vehicle seat configuration, such as any of the above described seat assemblies.

What is claimed is:

1. A vehicle seat assembly comprising:
   an air bag module having a front and a side, the air bag module including an inflatable air bag and a flexible fabric cover at least partially covering the air bag, the flexible fabric cover forming an outermost portion of the air bag module and including a protection portion that extends at least partially along the side of the air bag module, the protection portion having an end spaced away from the front of the air bag module, and the end is releasably connected to another portion of the air bag module;
   a seat pad disposed outside of the air bag module; and
   a trim cover positioned over the seat pad;
   wherein, upon inflation of the air bag, the end of the protection portion is configured to disconnect from the another portion of the air bag module and move forwardly such that the protection portion extends between the seat pad and the air bag, or between the trim cover and the air bag.

2. The vehicle seat assembly of claim 1 wherein the seat pad includes a seat pad portion disposed in front of the air bag module and having an outboard side, and wherein the protection portion is configured to extend between the outboard side of the seat pad portion and the air bag upon inflation of the air bag.

3. The seat assembly of claim 1 wherein the air bag module further includes an inflator connected to the air bag for inflating the air bag, and the flexible cover further covers the inflator.

4. The seat assembly of claim 1 wherein the end of the protection portion is releasably connected to the air bag.

5. The seat assembly of claim 1 wherein the protection portion is configured to remain inside of the trim cover during inflation of the air bag.

6. The seat assembly of claim 1 wherein the flexible cover includes a frangible portion, and wherein the end of the protection portion is releasably connected to another portion of the flexible cover at the frangible portion.

7. The seat assembly of claim 6 wherein the flexible cover includes an attachment seam that joins sections of the flexible cover together, and wherein the frangible portion is spaced away from the attachment seam.

8. The seat assembly of claim 6 wherein the frangible portion includes a generally vertical section spaced away from the front of the air bag module.

9. A vehicle seat assembly comprising:
   an air bag module having a front and a side, the air bag module including an inflatable air bag and a flexible cover at least partially covering the air bag, the flexible cover having a frangible portion that at least partially defines a flap portion, the flap portion extending at least partially along the front and the side of the air bag module and having an end spaced away from the front of the air bag module, wherein the flexible cover includes first and second ends that are joined together by an attachment seam, and the frangible portion is spaced away from the attachment seam;
   a seat pad portion disposed in front of the air bag module; and
   a trim cover positioned over the seat pad;
   wherein, upon inflation of the air bag, the frangible portion of the flexible cover is configured to rupture and the end of the flap portion is configured to move forwardly such that the flap portion extends between the seat pad portion and the air bag, or between the trim cover and the air bag.

10. The seat assembly of claim 9 wherein the flexible cover forms a band that extends around the air bag, and wherein the frangible portion is disposed at a rear portion of the band.

11. The seat assembly of claim 9 wherein the frangible portion defines top, bottom and rear portions of the flap portion.

12. The seat assembly of claim 9 wherein the flap portion is configured to cover and contact an outboard side of the seat pad portion or an outboard side of the trim cover during inflation of the air bag.

13. The seat assembly of claim 9 wherein the air bag module has a height, and the frangible portion includes a generally upwardly extending section that extends along a substantial portion of the height of the air bag module, and wherein the generally upwardly extending section is spaced away from the front of the air bag module.

14. The seat assembly of claim 9 wherein the frangible portion comprises a sewn seam.

15. The seat assembly of claim 9 wherein the frangible portion comprises a perforated section.

16. The seat assembly of claim 9 wherein the attachment seam comprises a sewn seam, and the frangible portion includes a perforated area spaced away from the sewn seam.

17. An air bag module for use with a vehicle seat having a seat pad and a trim cover positioned over the seat pad, the air bag module comprising:
   an inflatable air bag; and a flexible member covering at least a portion of the air bag and forming an outermost portion of the air bag module, the flexible member including a protection portion having an end that is spaced away from a front of the air bag module, the end being releasably connected to the air bag;

wherein, upon inflation of the air bag, the end of the protection portion is configured to be released from the air bag and extend forwardly such that the protection portion extends between a portion of the seat pad and the air bag, or between a portion of the trim cover and the air bag.

18. The air bag module of claim 17 wherein the end of the protection portion is releasably attached to the air bag with stitching or an adhesive.

19. The air bag module of claim 6 wherein the flexible member includes first and second ends that are joined together by a sewn seam, and the frangible portion is spaced away from the sewn seam.

20. The air bag module of claim 1 wherein the protection portion is configured to contact the seat pad or the trim cover upon inflation of the air bag.

21. The seat assembly of claim 9 wherein the flexible cover comprises fabric.

* * * * *